Dec. 3, 1968    G. J. DOUNDOULAKIS ET AL    3,414,666
WEAVED ELECTRONIC EQUIPMENT
Filed Oct. 14, 1963    9 Sheets-Sheet 1

FIG.1

INVENTORS:
GEORGE J. DOUNDOULAKIS
HELIAS DOUNDOULAKIS
BY
Constantine A. Michalos
ATTORNEY

3,414,666
WEAVED ELECTRONIC EQUIPMENT
George J. Doundoulakis, North Bellmore, and Helias Doundoulakis, Baldwin, N.Y., assignors to Electromechanical Devices, Inc., New York, N.Y., a corporation of New York
Filed Oct. 14, 1963, Ser. No. 315,900
3 Claims. (Cl. 174—68.5)

ABSTRACT OF THE DISCLOSURE

A woven electrical connector with wires and dielectric threads making up the warp members interwoven with other wires and dielectric threads making up the fill. The weaving pattern is governed to produce contact between warp and fill wires only at certain crossover locations, resulting in a specific network which, with the addition of specific electrical components, becomes a complete electrical circuit. Also included is means for producing the networks in quantities and for producing finished circuits incorporating the networks. Production of finished circuits is facilitated by novel clamping means to hold the terminals of the electrical components.

---

This invention relates to electronic circuits and an apparatus for fabricating them, and particularly to electronic circuits, consisting of electronic components connected to electrical conductors which are interweaved with dielectric string, whereby the electrical interconnection between the electronic components are determined by the weaving pattern while the dielectric strings serve as insulation between wires and an apparatus for the automated fabrication and testing of such electronic circuits.

Heretofore, wired electronic circuits were usually made by manual wiring and assembly. One of the conventional methods consists of mounting the electrical components such as resistors, capacitors, inductors and tubes on to binding posts secured on a metal chassis and a separate wire harness separately laid and laced on harnessing boards and subsequently attached to the electronic component terminals. The wire harness provides the interconncetions between the electronic components.

Another method which has been rather recently introduced, and has found wide acceptance, provides the wire harness for the interconnection between component terminals in the form of a printed circuit on dielectric sheets, and also provides predetermined locations for holes in which the electronic component terminals are inserted and subsequently soldered.

In both of these methods the labor costs are excessive and since the electronic components are spread over the surface of the electronic chassis or board on the basis of the specific requirements of each individual network, automation has marked little if any progress in the assembly and wiring of electronic circuits. Moreover, an excessive amount of engineering has to be provided for the layout of the electronic circuit, since the design of the interconnecting wire harness, wiring and assembly of subassemblies and other assemblies has to be carefully figured out and be designed step by step. Since each circuit assumes its own physical configuration, dissimilar to any other electronic circuit, any engineered layout becomes practically worthless for another circuit.

The wire assembly operator usually trims and bends the leads of every particular electronic component to comply with the wiring scheme of each particular component. Even in the case where the same electronic component is used, in several places in the circuit, the leads usually have to be cut and bent differently for each position of assembly. In addition, considerable time is also required for the operators to become familiar with what they are supposed to do, and thereby several new errors occur which slow up production even further.

At present, in the preparation of the wire harness, each wire has to be cut and stripped to a particular length and bent and laced with other wires in its proper position otherwise the ends will not reach the predetermined stations. The wiring operator has to solder each end of wire to its station. The wires are usually colored to help the operator avoid errors but even then, the operator either has to work slowly and carefully to avoid errors or work faster with the disadvantage of making many errors.

Further, the circuits present no geometrical pattern. Testing of a conventional circuit for errors or defective components becomes difficult and time consuming.

In summary, one may summarize and conclude, therefore, that the conventional methods are excessively expensive labor-wise, and time consuming with respect to the layout, wiring, assembly, and testing. Modern equipment such as computers and automatic programmers are of little use in these respects, mainly because of the lack of a common geometrical pattern in all electronic networks.

It is the purpose of this invention to provide a method and a means of automatically fabricating and testing electronic circuits.

It is an object of this invention to use modified conventional weaving machinery, controlled by a programmed memory system to automatically fabricate electronic circuits comprised of electronic components attached to wires which are woven with dielectric strings and which are spaced uniformly in the form of a rectangular matrix and which are interconnected between predetermined nodal points.

Another object of this invention is to provide means of supplying electronic components and attaching them in an electronic circuit with predetermined, uniform length and bent leads by standardizing distances between adjacent nodal points.

A further object of this invention is to provide electronic circuits in the form of a matrix of electrical conductors running in two directions such as warp wires and weft wires with dielectric threads interposed between the wires in such an arrangement whereby adjacent wires can be insulated from each other while each weft wire makes contact with, and therefore, is electrically interconnected to more than one warp wire, thereby eliminating the need of stripping and cutting wires to specific lengths or soldering each end of the wires separately.

A still further object of this invention is to provide means of supporting and interconnecting electronic components such as resistors, capacitors, inductors and transistors with interweaved wires, thereby permitting assembly, attachment, securing and welding the components by automatic machinery.

It is also another object of this invention to provide electronic circuits in which interconnections are supplied by the positioning of the electronic components and by using a programmed weaving pattern between warp and weft wires and warp and weft dielectric threads, thereby forming a rectangular matrix so that automatic equipment using special programming for each electronic network, can be used to manufacture and automatically test for errors the integrity of the electronic components, and the overall performance of the electronic circuit.

A still further object of this invention is to provide electronic circuits in the form of a rectangular matrix which can be automatically layed out, weaved, assembled, tested, welded, strengthened and packaged so that it may be produced at low cost, and in addition, can be compacted to save space in electronic equipment.

It is also a further object of this invention to be able to provide an electronic network in miniature whereby interconnections are made by weaving fine bare wire and fine dielectric threads.

Other objects and features of the invention will appear as the description of the particular physical embodiment selected to illustrate the invention progresses. In the accompanying drawings which form part of this specification, like characters of reference have been applied to corresponding parts throughout all the drawings.

In the preferred embodiment of the invention, the interconnections between the electronic components such as resistors, capacitors, inductors, transistors, and other components are made by interweaving wires with dielectric threads. The interconnections are arranged by a predetermined pattern and the bare warp wires are separated to prevent contact with each other by means of warp dielectric threads running parallel and between the warp bare wires. Bare wires in the form of weft are then employed to interconnect the bare warp wires at predetermined points.

In addition, bare weft wires are separated from each other and from making contact with the warp wires at crossings where electrical contact is not desired by interweaved dielectric threads. The same dielectric threads also force warp and weft wires for making contact at crossings where electrical contact is desired in accordance with a programmed design.

Even though other weaving patterns can be used, the present embodiment shows a pattern employing for each bare warp wire, three dielectric threads. It can be also understood, therefore, that the three dielectric threads may conveniently be used to control the spacing between the bare wires. This pattern also provides for each bare weft wire to be followed by three dielectric threads. Thus, for this embodiment any two adjacent bare wires, warp or weft, running in the same direction are separated by three dielectric threads. This pattern provides that when two crossing bare wires, one warp and one weft are to make electrical contact, the bare warp wire goes over the bare weft wire, the adjacent dielectric warp threads go under the weft bare wire, and the adjacent weft dielectric threads, one on each side of the bare weft wire are weaved under the warp bare wire. In this manner the adjacent weft dielectric threads pull the bare warp wire downwards, while the adjacent warp dielectric threads push the bare weft wire upwards so that the two crossing wires are forced towards each other to make electrical contact. At the crossing where the bare warp and weft wires are not to touch, the bare warp wire runs under the bare weft wire, while the adjacent dielectric threads are woven in the same manner as above to keep the bare wires apart. That is, the forces exerted by the adjacent dielectric threads are now working to pull the crossing bare wires apart to prevent electrical contact. A minimum number of bare wires sufficient to accommodate the electronic components are used. However, in certain instances wires connected to ground may be introduced between conductors to reduce mutual coupling. The dielectric threads also serve to interlock the structure and produce a single assembly. As provided in this embodiment, it has been found convenient to run three dielectric threads before and after the bare warp and weft wires in order to interlock the weave at the edges.

No restrictions are imposed as to the type of form and material of the wire or dielectric threads to be employed. The wires may be elongated structures of any cross section, possessing the property of an electrical conductor. In this embodiment round cross-sectional wires are used since this type of wire is easily manufactured. The wires may be stranded wires consisting of several fine wires twisted together or may consist of dielectric threads covered by an electrical conductor or dielectric threads impregnated by an electrical conductor. This implies that what is referred to as electrical wires in this description can comprise an absorbent dielectric thread impregnated with electrical conducting substances such as carbon or an electrolyte such as cotton thread impregnated by a solution of salt. The dielectric threads may consist of any dielectric material such as fiberglass, Teflon, nylon, cotton, linen or even twisted paper.

Having formed the weaved wire assembly as provided in this embodiment, the electronic components may be attached between wires at any convenient point of the woven material. Although components can be mounted on the surface of the woven material between predetermined wires, it appears more convenient that the electronic components be mounted along the edge of the woven material and preferably to the warp wires. In this manner automated equipment can be employed at the terminals of the bare warp wires, at two edges of the weaved assembly to provide for fast and economical attachment of the electronic components to the wires during manufacture of the weaved harness.

It can be understood that sufficient flexibility exists in the layout of the pattern with relation to the electronic circuit which allows the assignment of the wires in such an order that the transverse distance between the ends of the leads of the electronic components can be made to correspond to the separation of the wire terminals. Since the distance between wires is uniform the length and means for bending of the leads of the electronic components can be standardized. In addition, the feeding of the electronic components during the assembly of the electronic network can be easily automated. The electronic components can be supplied to the network, such as by hoppers, with their leads prebent prior to their insertion into the automatic equipment which feeds the components into the weaved network for attachment thereto.

The electronic components may be directly attached to the conductors of the woven material such as by soldering or by welding each electronic component across the proper conductors or by connecting each lead of the electronic component with the proper conductor by means of a metallic band which can be crimped around both the lead or leads of electronic components and the proper electrical woven conductor to provide, thereby, both mechanical and electrical assembly. Another method is to provide a rigid dielectric body having metallic elements, each of which can be crimped around the lead or leads of electronic components and the proper conductor of the weaved material. This method provides a rigid support for the electronic components with mechanical and electrical connection between the leads of the electronic components and the proper electrical woven conductors. For further degree of reliability the crimping metallic elements may be touched with molten solder for soldering, or may even be spot welded electrically.

Several choices also present themselves with respect to the contacts between the crossings of the electrical conductors in the woven material. For example, they may be left as they are woven or may be welded together by spot welding or soldering, depending on the material used in the weaving of the network and on the degree of reliability needed.

In addition, the woven material may be installed and operated in the electronic equipment as it comes out of the weaving machines with the electronic components attached to it, or it may be impregnated with plastic substances such as polyester resins for rigidity and further reliability.

If space is of importance, several woven networks can be stacked together, one above the other, or laminated together with the electronic components extending outwards from each layer. In this manner several networks can be combined into an integrated network which will have the form of a parallelopiped, the volume of which can be fully utilized to provide the electrical interconnections between the electrical components covering the side surfaces of the parallelopiped. In addition, interconnection between the layers can be made on the side surfaces of the parallelepiped.

The geometry involved in this type of network construction provided by the invention renders itself to a large degree of standardization and highly automated processes. The weaving of the electrical conductors with the dielectric threads may be accomplished by an automated power loom, the sequence of operations of which are prescheduled, stored and supplied to it from a storage device. Although mechanical storage means such as cams may be used, due to the complexity of the pattern, it is preferable that the storage means be capable of storing and dispensing a relatively large amount of information in a standardized, uncomplicated and preferably economical manner. A punched tape of sufficient width to contain the number of holes required appears to fulfill these qualities. The tape can be joined at the ends and inserted over a pair of cylinders for transport over a reader section. Each complete transport of the tape will correspond to the weaving of one of several identical networks. The different parts of the weaving machinery can be activated in accordance with the programming of the punched tape. The position and length of each hole on the programming tape may be utilized to determine the exact time a particular part of the weaving machine may be activated and for how long it must remain activated. Other types of storage memory machines may be used such as magnetic storage in terms of pulses or special frequencies or any other conventional storage device may be employed to store and supply the required program to the weaving machine. Electromechanical devices may be then employed to activate each particular part of the weaving machine. It should be understood that standard weaving machines can be easily adapted for this type of work and, in addition, commercially available tape transports and readers may be easily adapted for the storage and readout of the programming from the weaving machine.

The manufacture of electronic networks in accordance with the invention can proceed in separate successive stages, some continuous and some intermittent. Thus, first the electrical conductors and the dielectric threads which are to feed the warp to the weaving machine are wound on special spools as in conventional weaving machines. Each thread of electrical conductors and dielectric threads is then threaded through its appropriate path and mail of the weaving machine. The weaving machine operates in accordance with the instructions received from the information storage through the electromechanical devices and weaves the network in accordance with the feeding program. Conventional methods can be employed in the weaving machine to stop the weaving machine automatically in case any of the threads, whether an electrical conductor or a dielectric thread belonging to either the warp or weft, happen to break or be depleted. An operator then can attend to correcting the cause of stoppage so that the weaving machine can be started to continue the weaving operation.

When it is desirable that the contacting crossings between warp and weft conductors be spot welded a facility for spot welding may be provided immediately following the vicinity where the reed of the loom strides the electrical conductor. The reason this location is chosen for spot welding is because the position of the weft electrical conductor is precisely positioned with respect to the reed at that point. Spot welding may be accomplished by pairs of electrodes, one pair for each warp wire, one electrode supported above and the other below the woven material, each possessing electromechanical means so that the predetermined pairs of electrodes can close and spot weld the particular crossing. It should be noted that the programming and timing for the spot welding may be supplied from the same storage device.

The weaving machine also may possess conventional means of keeping proper tensions in the weave and unwinding the required warp to feed the weave. In addition, the machine can either wind the weaved material on a cylinder which can be later supplied for further processing in another operation or have the woven material go through two pairs of cylinders, preferably covered with rubber to grip the woven material and, thereby supply proper tension. The tension may be supplied by one pair in the direction away from the weaving machine and the other towards the weaving machine. The material in between these two pairs of cylinders can then remain loose and be pulled intermittently for further processing. Further processing will involve, for example, the removal of warp dielectric threads located between two successive woven networks, so that they may not interfere with the attachment of the electrical components to the electrical conductors. Still another processing needed to prevent this weave from becoming loose at its edges prior to cutting the dielectric warp may involve impregnation of the woven material by means of quick curing plastic such as an epoxy or a polyester resin. Although cutting of the dielectric warp may be accomplished by a knife edge, toothed in such a manner so that it would cut the wires, it would appear more convenient that the dielectric warp is cut by a hot wire in the form of a loop which may be moved transversely over the warp.

Next, the network may be held stretched by the warp electrical conductors while the electrical components are attached. The stretching and aligning may be done by a set of two special clamping devices, one located before and the other after the electronic component attaching equipment. The aligning and stretching device can provide grooves in which the warp electrical conductors can be inserted to be clamped. One of the two clamping devices may possess the facility of being displaced while holding the warp electrical conductors and thus apply the required tension so that the warp electrical conductors may be aligned in relation to the equipment introducing the electrical components.

The equipment for mechanically and electrically connecting the electronic components to the woven material constitutes another important part of the process of automatically producing electronic equipment in accordance with this invention. In the preferred embodiment a pair of attaching equipment is located between the set of clamping devices described above. A special dielectric support may be employed for the electronic components. This dielectric support comprises metallic elements for joining the warp wires and the leads of the electronic components. The electronic component attaching equipment has means to store and supply the electronic components, means for holding the dielectric support in proper position, means of positioning the electronic components so that the leads of the electronic components can be inserted into prescribed holes in the dielectric support, means of bending the leads of the electronic components into the metallic elements, and means of crimping the metallic elements around both the warp wires and the leads of the electronic components to form both mechanical and electrical assembly. The leads of the electronic components may be prebent and precut by a special machine before they are introduced into the supply means which may consist of specially designed hoppers. It is also possible that the electrical components may be attached to the metallic elements on the dielectric support at a different station and the preassembled unit may be crimped in one operation on to the warp wires. If desirable the metallic elements which serve to crimp and connect the warp electrical conductors with the electronic components can be touched on to the surface of a bath of molten solder for further securing the connections. At this point the woven material can also be impregnated with the protective coating such as polyester resin and subsequently cured. If desired, the leads of the electronic components may be bent to permit the electronic components to lay flat with the rest of the woven material. It appears convenient that holding and tensioning means will exist at the end of the line of the above processes to keep the warp wires in tension and carry away the assembled networks after they are assembled, tested, and unclamped. Such tensioning means can consist of a continuous conveyor chain-like arrangement.

After separation of the networks, each network can be automatically tested through contacts with the metallic elements on the dielectric support and with use of a programmed switching mechanism. The woven network after testing is ready to be used as intended. Large electronic components such as large transformers, tuning devices, loudspeakers and large tubes, if they exist, can be positioned on separate places of the electronic equipment and the few wires necessary to connect them with the woven network can be wired in the conventional way.

Figure 1:
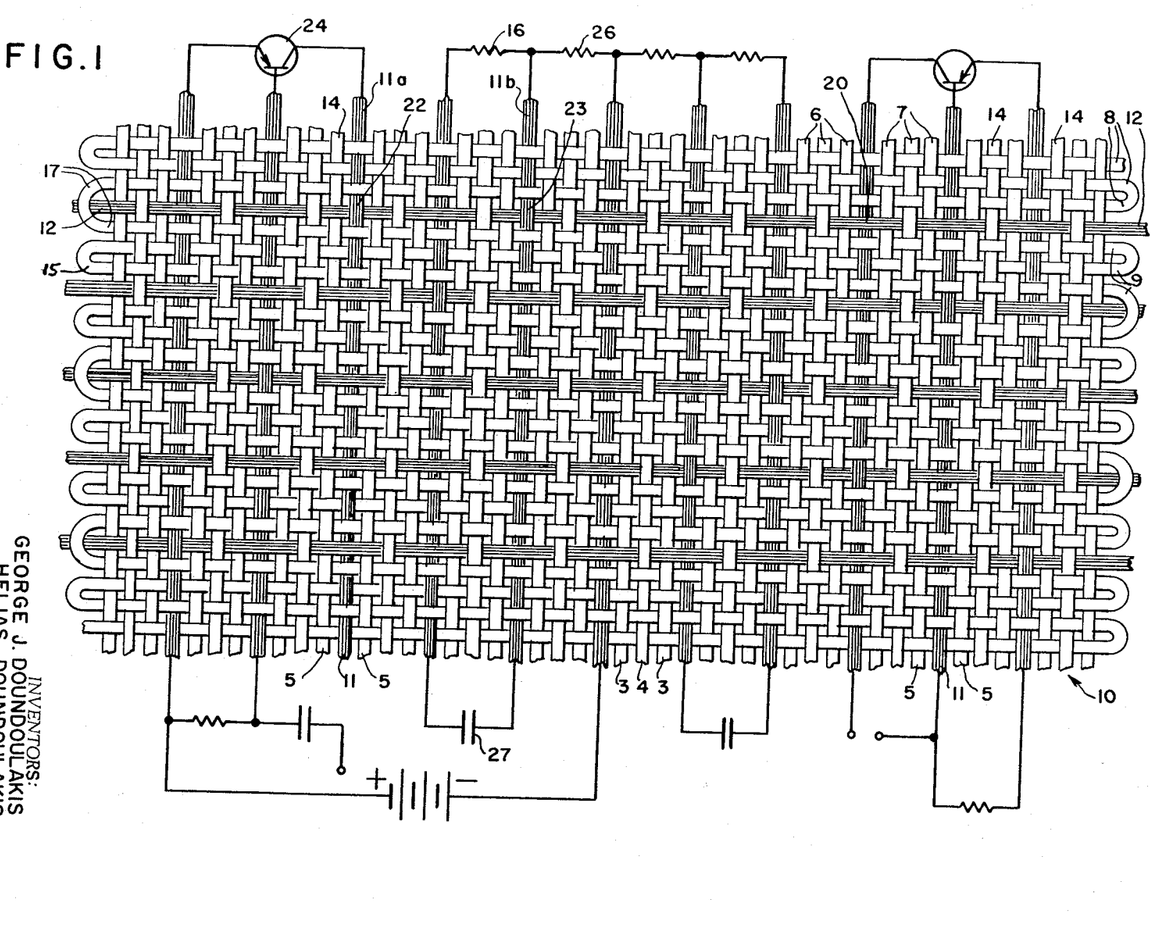
FIGURE 1 is a view of a weaved electronic network in accordance with a preferred embodiment of the invention.

Referring to the drawing in detail and particularly to FIGURE 1, an electronic network 10 is shown weaved with electrical conductors 11 introduced into woven material as part of the warp and electrical conductors 12 introduced into the woven material as weft. Dielectric threads 14 are introduced in the woven material 10 as warp and dielectric threads 15 are interwoven as weft. A predetermined weaving pattern in the network 10 determines at which crossings electrical conductors 11 and 12 will or will not make an electrical connection. The preferred weaving pattern used in network 10 provides for three dielectric threads 6 to precede and three dielectric threads 7 to follow each electrical conductor 11 in the warp. The pattern also provides for three dielectric threads 8 to precede and three dielectric threads 9 to follow an electrical conductor 12 in the weft. Crossings of the electrical conductors 11 and 12, such as at 20, where an electrical connection is not desired, remain open by the electrical conductor 11 being forced downwardly using dielectric threads 17 and the electrical conductor 12 being forced upwardly using dielectric threads 5. Electrical connections between the electrical conductors 11 and 12 in crossings such as 22 are accomplished by having electrical conductor 11 forced downwardly on to the electrical conductor 12 by the dielectric threads 17 and the electrical conductor 12 forced upwardly against the conductor 11 by the dielectric threads 5. Since crossing 23 constitutes an electrical connection as in 22, warp electrical conductors 11a and 11b are electrically interconnected by weft electrical conductor 12. This becomes equivalent to joining by a wire the collector of a transistor 24 with the common point of resistors 16 and 26, and one end of condenser 27. In this manner all necessary connections between the electronic components are made to form the electrical network 10. The electrical network shown in FIGURE 1 represents an Eccles-Jordan trigger circuit, which can be woven automatically by modified conventional weaving looms.

Figure 2:
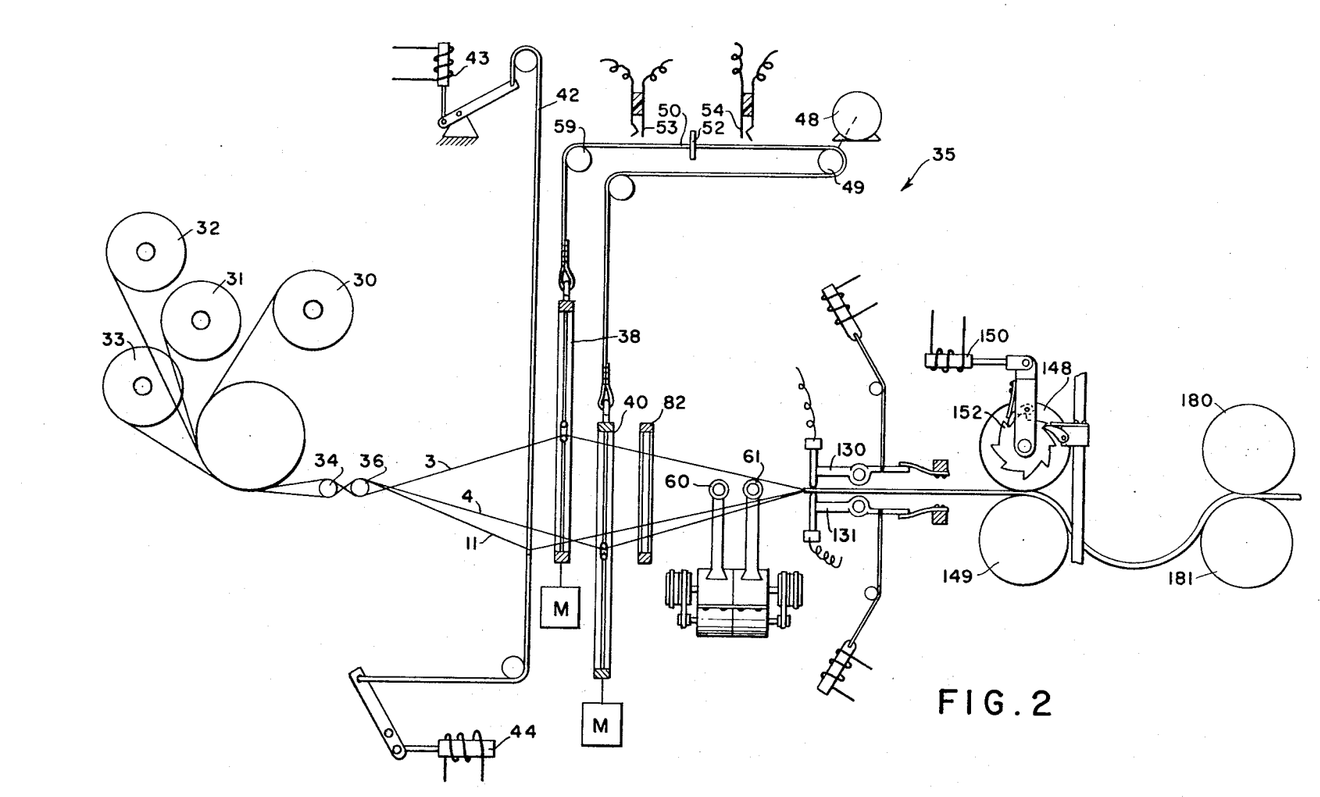
FIGURE 2 is a schematic side view of a preferred embodiment of the invention showing a portion of an automatic weaving mechanism employed in the manufacture of the weaved network referred to in FIGURE 1.

Since the shedding of each warp wire will have to be controlled individually, programmed looms such as the Jacquard or the Dobby type looms may be conveniently employed for weaving a required pattern. The Jacquard and Dobby type looms are programmed in terms of holes punched in special cards and wide tape, respectively, while the reading and execution of the program is accomplished by mechanical means. Although the conventional type looms may work satisfactorily for the automatic production of the woven network, it is felt that, in certain instances, an electronically controlled loom will present greater flexibility. This will be certainly true for the case when computers will advance to the stage where the pattern to be woven can be computed and supplied to the loom by the computer, substantially concurrently with weaving. Also, since electronic storage means are advancing very fast, it is very probable that when a loom is to be used for weaving, a great number of unrelated networks, it will be more economical for the loom to receive direction in terms of electronic signals directly from such electronic storage means. For this reason an electronically controlled loom as shown in FIGURE 2 is presented in the drawings. The electronic signals are here shown to be derived from a programming punched tape; but may be noted that such signals may also be supplied by electronic storage means. For example, programming signals may be stored and supplied from a magnetic tape recorder providing individual frequency pulses of controlled duration for each controlled part of the loom. Each part of the loom then can contain a sharply tuned filter so that the part will be activated only while the frequency corresponding to its operation is present in the supplied signal.

Figure 3:
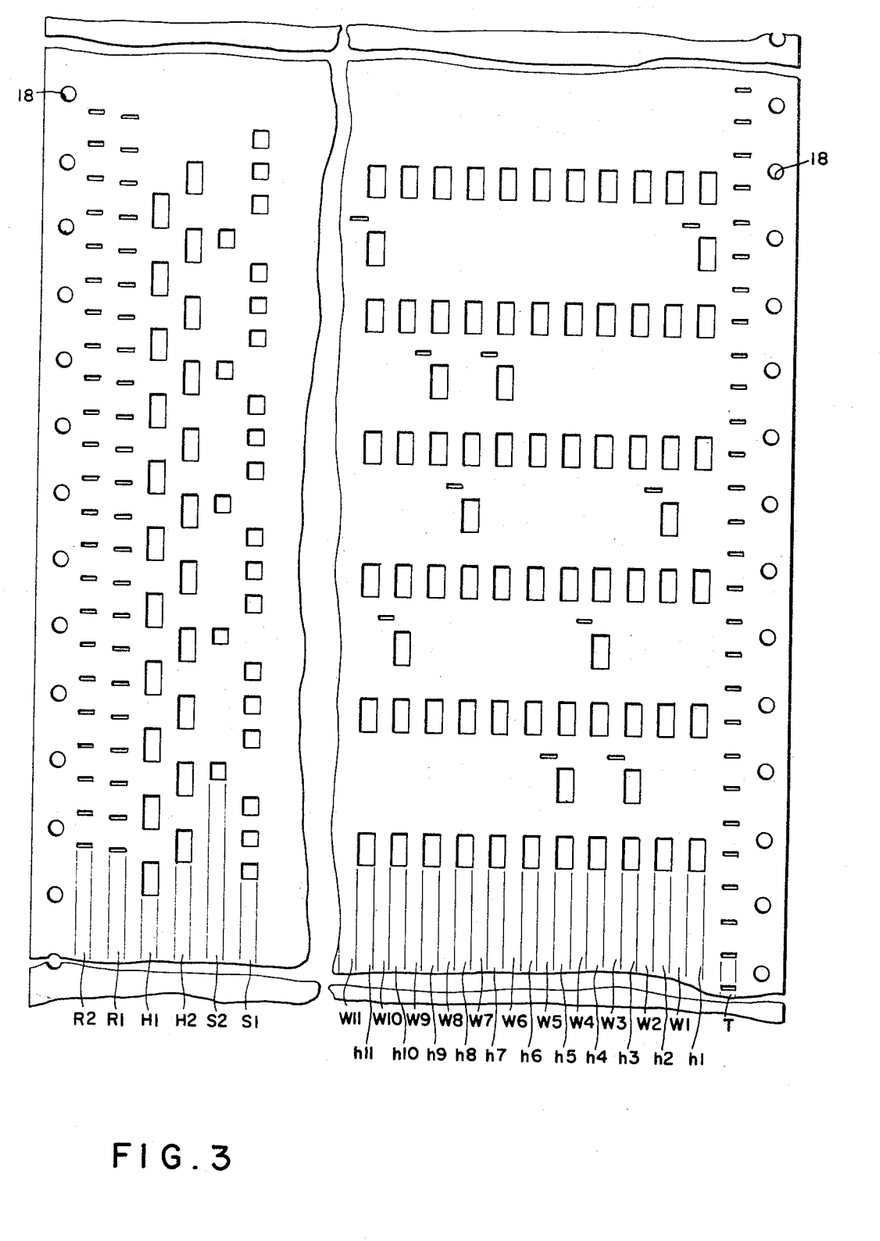
FIGURE 3 is a view of a programming element used to automatically operate the mechanism referred to in FIGURE 2.

In this embodiment, the programming means is a punched tape as shown in FIGURE 3. This tape provides holes 18 on each side for pins of a driving cylinder (not shown) to drive the tape. In addition, the tape provides holes of constant width but varying length. Each hole operates effectively as a switch. The beginning of the hole determines the instant at which a particular operation is to start and the length of the hole in the direction of tape travel, controls the time interval of the operation. Each column of holes shown in FIGURE 3 represents a particular operation in the weaving and spot welding processes in the manufacture of the network, as hereinafter more fully described.

Figure 22:
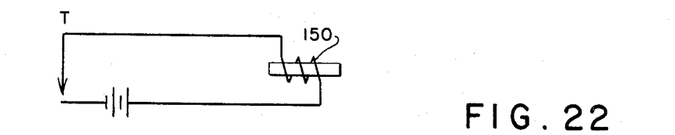
FIGURES 22 to 25 are schematic electronic diagrams showing electronic circuits imployed to control the mechanism shown in FIGURE 2.
Figure 23:
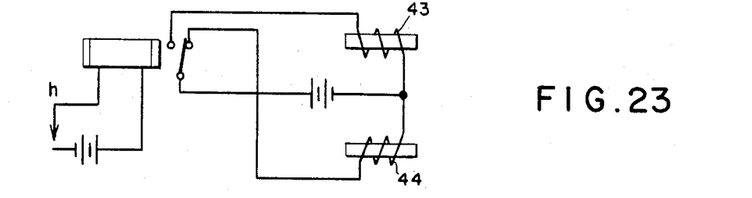

Referring to FIGURES 2, 3 and the electrical circuit FIGURES 22 through 26, spools 30, 31, 32 and 33 shown in FIGURE 2 supply the warp for an automatic loom 35. Spool 30 supplies the warp electrical conductors 11 and spools 31, 32 and 33 supply the dielectric threads 11, which extend parallel to the warp electrical conductors 11. Rods 3 4and 36 are introduced after the spools to properly space the warp. The portion of the loom which operates upon the warp threads as to make the opening through which a shuttle or shuttles can move, are distinguished in three parts, healds 38, 40 and 42. Healds 38 control the shedding of the dielectric threads 3. Healds 40 control the shedding of the middle warp dielectric threads 4 located in between warp dielectric threads 3. Electrical conductors 11 are controlled by individual healds 42 which in turn are operated by solenoids 43 and 44. Solenoids 43 and 44, which operate at the extremes of healds 42 are activated or de-activated by a switch which is supplied through holes $h1$ through $h11$ of tape shown in FIGURE 3. FIGURE 23 shows a schematic diagram of the electrical network associated with the operation of solenoids 43 and 44 controlled by switch $h$ of FIGURE 23 represented by holes $h1$ through $h11$ shown in FIGURE 3.

Figure 25:
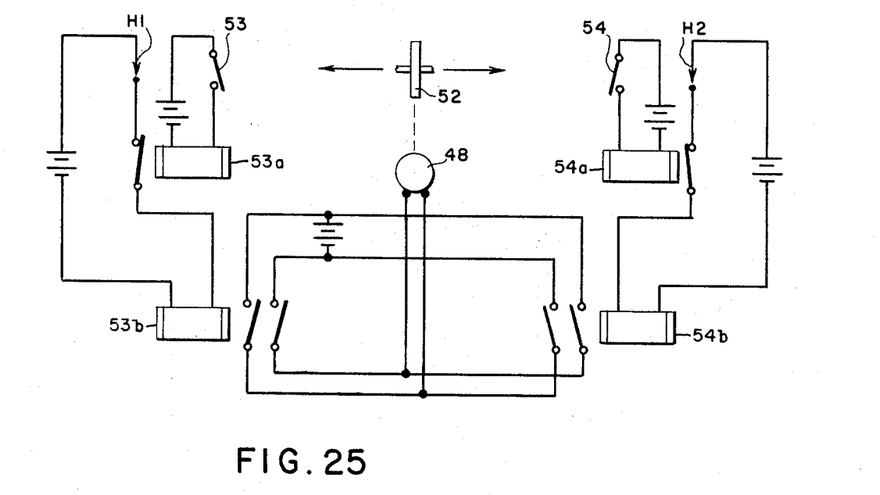

Referring to FIGURE 2, the position of healds 38 and 40 is determined by the position of holes in the columns H1 and H2 of FIGURE 3. While heald 38 is up, heald 40 is down and vice-versa. These healds may be operated by a single reciprocating actuator 48 and an associated pulley and belt arrangement 49, interconnected as one unit. For example, as shown in FIGURE 2, heald 38 is suspended at one end of a cord or belt means 50, operating over pulley 51. Heald 40 is shown suspended at the other end of belt 50. Actuating means 48 reciprocates a lug 52 between limit switches 53 and 54. Weights M provide tension in belt 50 for proper reciprocating action. The electrical network which activates healds 38 and 40 is shown in FIGURE 25. This network operates in conjunction with holes H1 and H2 of punched tape shown in FIGURE 3, which also operate as switches like holes $h1$ through $h11$. The operating switches H1 and H2 together with the contacts of relays 53a and 53b respectively control relays 54a and 54b which in turn control the raising of healds 38 and 40 respectively as best shown in FIGURE 3. The weft threads in the form of filling dielectric threads and wires are supplied to the shedding of warp by conventional means such as shuttles 60 and 61, shown in FIGURE 2. This means is particularly convenient for supplying the weft dielectric threads, and fine wires. Special means, such as shooting the filling wire to the shedding may be used in this embodiment. This second method is especially applicable when the filling wires are not as flexible as thin wire. In addition, FIGURE 2 shows a reed system 82 which serves to strike each weft thread after it is threaded by the shuttle towards the woven portion. Since the reed reciprocates in a similar fashion as healds 38 and 40, an electrical circuit similar to that shown in FIGURE 25 is used. Columns of holes R1 and R2 are provided on the punched tape of FIGURE 3 to supply switching for the operation of the reed. The separate holes R1 and R2 are assigned for the forward and reverse motion of the reed for the purpose of being able to hold the reed in the forward position while the process of welding the crossings between weft and warp electrical conductors takes place, as hereinafter more fully described.

Figure 24:
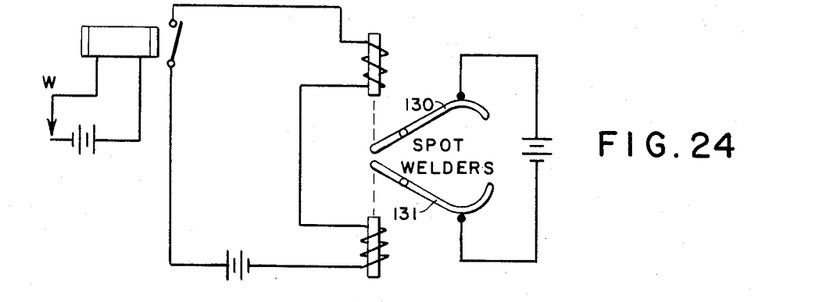

Not all crossings are welded. However, the crossings where electrical contact between warp and weft wires is needed in accordance with the requirements of the particular network being fabricated are spot welded by a pair of spot welders 130 and 131. For each warp wire the system has a pair of spot welders which operate depending on the signals received from the series of holes W1 through W11 of the punched tape shown in FIGURE 3. The electrical circuit for this operation is shown in FIGURE 24.

Referring again to FIGURE 2, after weaving and spot welding, two cylinders 148 and 149, preferably covered with rubber or rubber-like material, serve to continuously remove the finished portion of the woven material. Cylinder 148 is operated by means of solenoid 150 which is activated from the programmer and particularly from punched holes indicated by the letter T on the punch tape diagram of FIGURE 3. The electrical circuit associated with this operation is shown in FIGURE 22. As shown in FIGURE 3 for every filling thread, whether dielectric or wire, the ratchet system 152 advances one step.

After weaving, the material may be stored or be picked up by a pair of cylinders 180 and 181 as needed for further processing. The woven material is stretched between the pair of cylinders 180 and 181 and a tensioning device to be later described. The pair of cylinders 180 and 181 are followed by a hot wire loop cutting means 190 shown in FIGURES 4 and 5. The hot wire cutting means is shown in side view in FIGURE 4 and in front view in FIGURE 5. The purpose of this cutting means is to cut the warp dielectric threads outside the woven portion to facilitate attachment of the electronic components. Hot wire loop 196 is supported by support 194 which acts as a carriage and is attached on to a dovetail sliding arrangement 195. The support 194 slides horizontally on a structural member 192. A motor 200 attached on the support 194 supplies power for forward and backward motion by means of a reversing, three-position switch 202 which connects power polarity for forward or backward movement of the motor from battery 204. A rack and pinion arrangement consisting of rack 199 and pinion 198 provides the motion of carriage 194. One passage of the hot wire loop 196 over the warp is sufficient to cut the warp dielectric threads. The support 194 carrying the hot wire loop then stops at one end of its travel to permit advancement of the warp for the next cutting operation.

Figures 4, 5, 6:
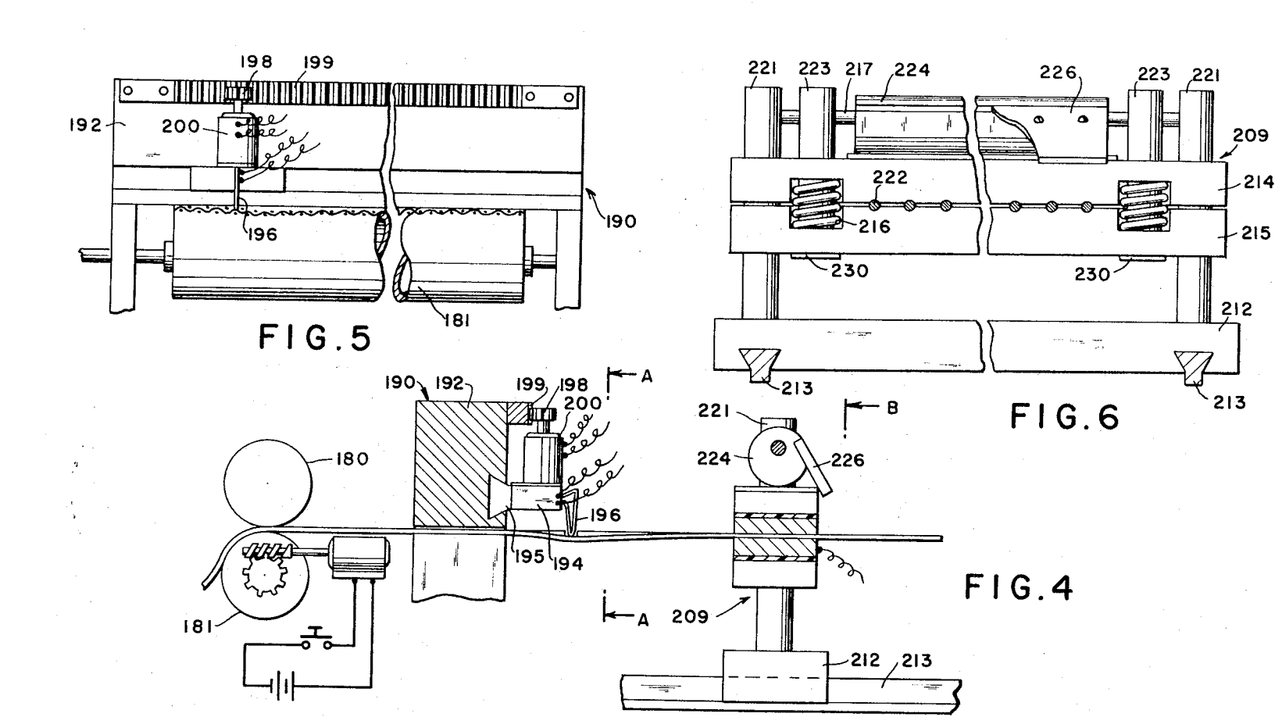
FIGURE 4 is a schematic side view of a mechanism for dielectric cutting and a clamping mechanism.
FIGURE 5 is a sectional view of the dielectric cutting mechanism taken along line A—A of FIGURE 4.
FIGURE 6 is a sectional view of the clamping mechanism taken along line B—B of FIGURE 4.

Following the cutting operation of the dielectric threads, the woven network is clamped between two clamping devices 209, one on each end of the woven network. A side view of one such clamping device 209 is shown in FIGURE 4 and a sectional front view of the same device is shown in FIGURE 6. The clamping device 209 comprises a base 212 which is movably supported on dovetail rails 213. Vertically extending sliding supports 221, one on each side of the device, support two clamping jaws, a lower jaw 215 and an upper jaw 214. Sliding jaws 214 and 215 are kept apart by means of springs 216 located circumferentially around cylinders 223. The sliding jaw 215 is supported by an enlarged portion 230 at the bottom of cylinder 223, which is connected to the support 221 through a shaft 217. The two sliding jaws 214 and 215 are forced together by means of a cylindrical cam 224 and associated handle 226. When operating handle 226 is rotated clockwise as shown in FIGURE 6, the two sliding jaws 214 and 215 are compressed together against the action of springs 216. Jaws 214 and 215 are provided with semicircular grooves 222, through which the warp electrical conductors are clamped. The distance between the two clamping devices 209 may be easily adjusted to conform with the size of the woven network. The clamping devices 209 hold the woven material in tension through the warp electrical conductors and in alignment while the electrical components are attached to the woven network.

Figure 7:
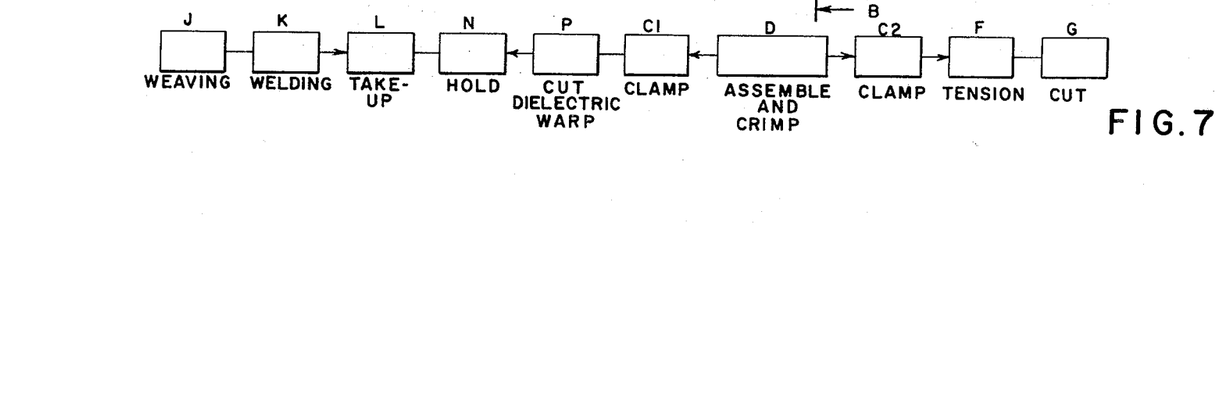
FIGURE 7 is a block diagram showing the stages of manufacturing the weaved network referred to in FIGURE 1.

Referring now to FIGURE 7, it is seen that the sequential stages of manufacturing the complete electronic circuit provides for a weaving stage J, and a welding stage K, as hereinbefore described, and a take-up means L in storing for further processing the weaved material. A holding stage N is used to hold the end of a length of the weaved material fed into the system for further processing. The warp dielectric is then cut and removed from in between successive woven networks at the cutting stage P. The network is then clamped between two clamping devices C1 and C2 for the assembly and crimping of the electrical components on to the network at the assembly stage D. Following clamps C2, a tensioning stage F is shown which serves to hold the processes network in tension for clamping and assembly in the assembly stage D. Finally, the finished circuit is cut and removed for use.

Figure 8:
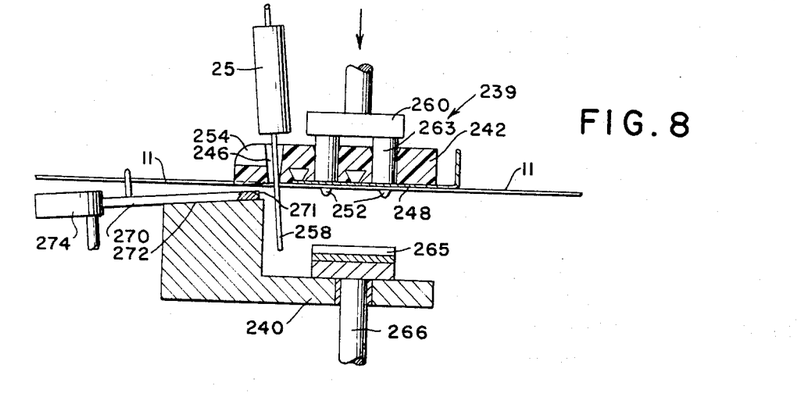
FIGURE 8 is a side view of a mechanism for assembling the electronic components to the weaved network shown in FIGURE 1.
Figure 9:
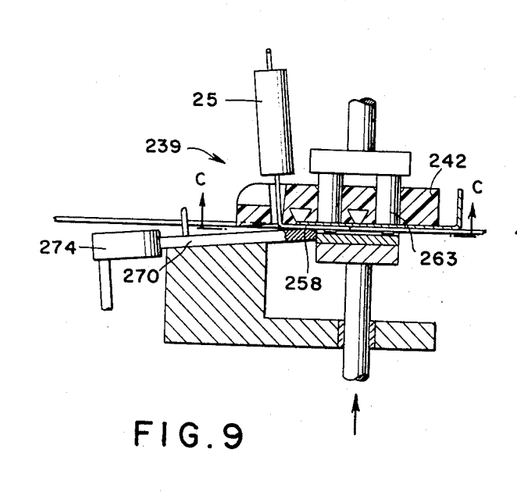
FIGURE 9 is a side view as in FIGURE 8 but of a different operating position.
Figure 10:
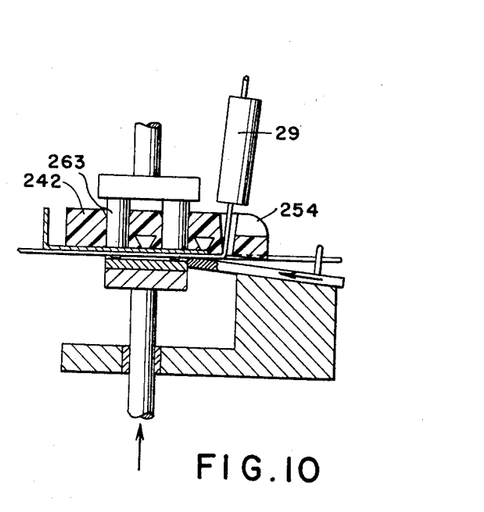
FIGURE 10 is a side view of a mechanism as shown in FIGURE 9 operating on the other end of the weaved network, shown in FIGURE 1.
Figures 11, 12, 13, 14:
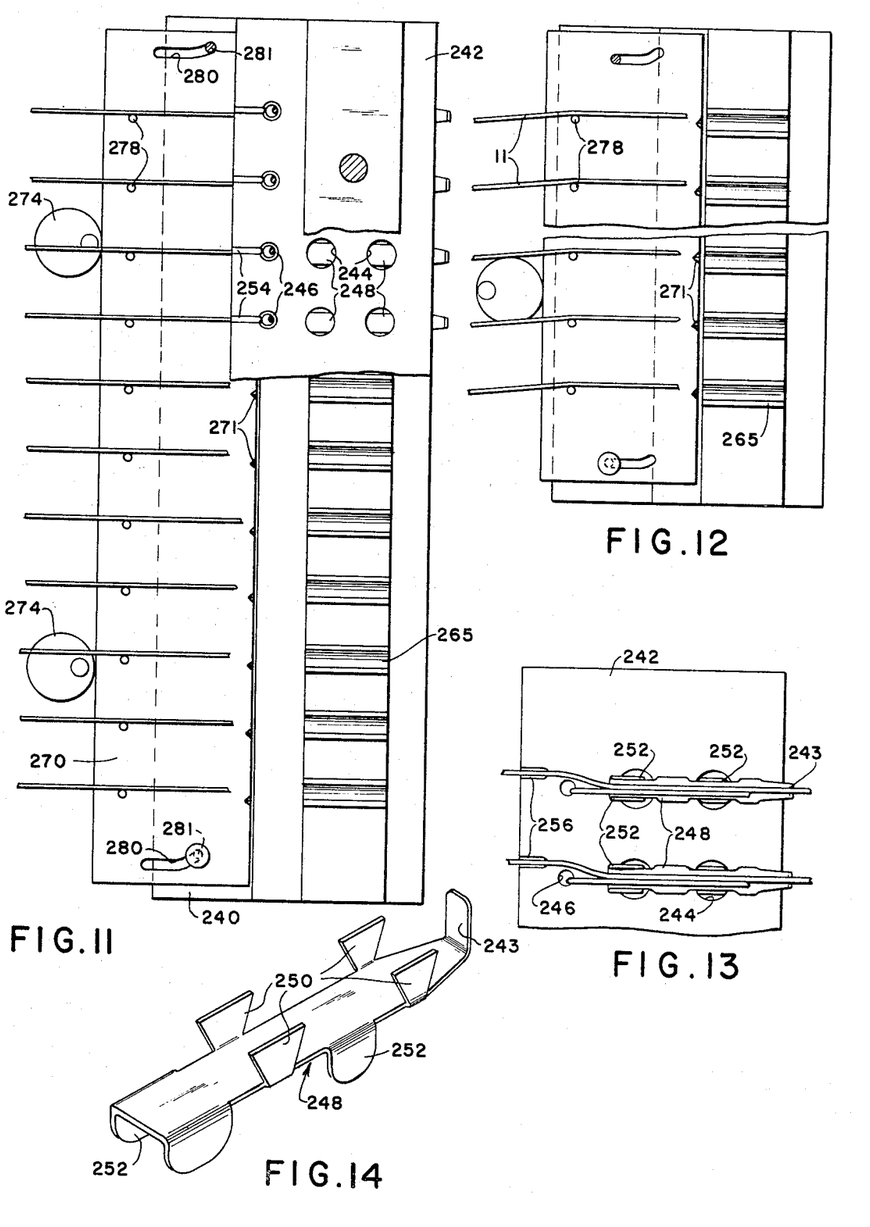
FIGURE 11 is a sectional view of the mechanism shown in FIGURES 8 and 9 taken along line C—C of FIGURE 9.
FIGURE 12 is a fragmentary sectional view as shown in FIGURE 11 but at a different operating position.
FIGURE 13 is a detailed fragmentary bottom view of a dielectric support for the electronic components.
FIGURE 14 in an enlarged perspective view of one of the elements shown in FIGURE 13.

The preferred embodiment comprises a dielectric connector mount 242 shown in the assembly and crimping equipment of FIGURES 8 through 17. The mount 242 serves as a permanent mounting means for the electrical components and also as a permanent support for metallic elements 248, used in interconnecting the leads of said components with the electrical conductors. Due to the arrangement of the metallic elements, they may also serve as means of connecting the completed network with another network or with a test set up by use of pins 243 integral to the metallic elements. The assembly and crimping equipment shown in FIGURES 8 through 17 are used to attach the electronic components to the electrical conductors 11 of the woven network and crimp the leads of said components together with the electrical conductors. FIGURE 8 shows an attaching and crimping machine which serves to join the leads of the electronic components with the electrical conductors. The support mount 242 which may be specially molded with the metallic element 248 is shown in side cross-sectional view in the crimping machine 239 of FIGURE 8. The dielectric mount 242 is provided along its length with holes 244 and with conical holes 246. FIGURE 13 shows a bottom view of two metallic elements 248 and FIGURE 14 shows a perspective view of such metallic element. Dovetail portions 250 of the metallic element 248 are molded within the dielectric 242 for firm gripping of the two parts. Holes 244 are provided on the mount 242 for the purpose of allowing the insertion of equal size metallic plungers 263, which serve as a holding and back-up means for the dielectric support while the electronic components are being assembled and crimped. The conical holes 246 permit one or two leads of electronic components to be inserted through the mount for attachment to the metallic elements 248. Located next to the conical holes 246 are slots 254 which provide depressions into which the leads of the electronic components can be bent to be positioned on the same plane as the woven material. The plungers 263 are integral to a vertically movable plate 260 which is held upwardly for the attachment of the dielectric support 242 and then lowered to the position shown in FIGURE 8. This motion positions the metallic elements 248 over the stretched and aligned electrical conductors 11. The electronic components 25 are lowered by a special device 300 as hereinafter more fully described, with their leads 258 inserted through the conical holes 246. The structure of the crimping machine 239 has an inclined surface 272 along which a vane 270 slides to bend the lead 258 parallel to electrical conductors 11 between tongs 252 of the metallic elements 248 as best shown in a bottom view in FIGURE 13. Vane 270 moves by means of cams 274 in two steps. The first step occurs as soon as the dielectric support 242 is lowered to the position shown in FIGURE 8. The vane moves in a diagonal direction both forward and slightly sideways by means of slots 280 on the vane 270 sliding over fixed pins 281 of base 240. Pins 278 integral to the vane displace the electrical conductors 11 to drop into slots 256 provided on the mount 242, shown in FIGURE 13. This is done for the purpose of moving conductors 11 sidewise away from the opening of holes 246, through which leads 258 of components 25 drop. The second step occurs after the leads 258 are lowered, at which time the vane 270 extends forwardly to bend the leads and guide them by notches 271 inside the metallic tongs 252. While vane 270 is still holding the bent leads of the electronic components, plunger 266, having crimping ridges 265, moves upwardly to bend the metallic tongs 252 inwardly around the metallic conductors 11 and leads 258 of the electronic components 25. FIGURE 9 shows the crimping device at the position where the vane 270 has advanced forward and plunger 266 has been pushed up while the metallic elements are backed by the plungers 263. FIGURE 10 shows the same operation being performed by a crimping machine 264 having a conductor 29 being connected on the other end of the woven network. FIGURE 11 is a top view of the crimping machine 239 showing the vane 270 before it has started its first step. FIGURE 12 is a top view of the crimping machine with the vane 270 in the end position of the second step.

Figures 15, 16, 17:
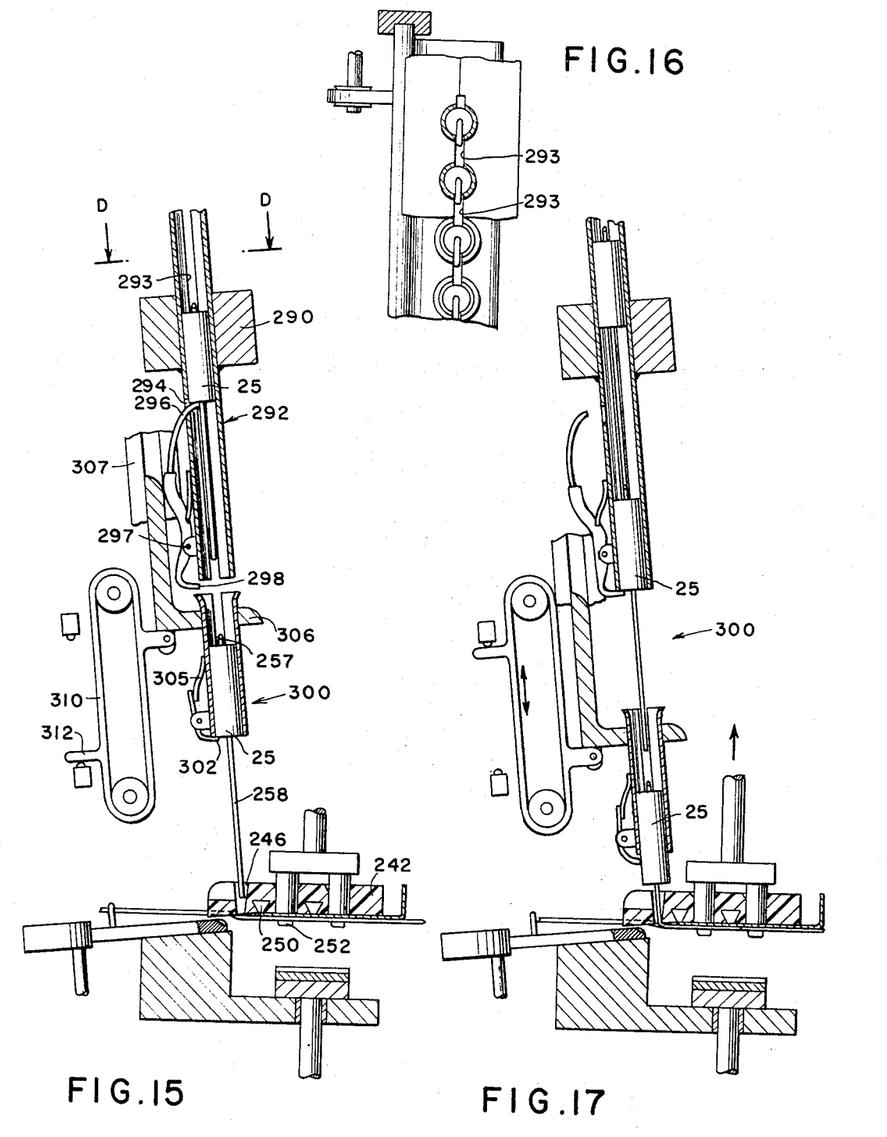
FIGURE 15 is a side view of a mechanism feeding and connecting the electronic components to the dielectric support shown in FIGURE 13.
FIGURE 16 is a fragmentary sectional view of the feeding and connecting device taken along line D—D of FIGURE 15.
FIGURE 17 is a side view of the device shown in FIGURE 15 but of a different operating position.
Figure 18:
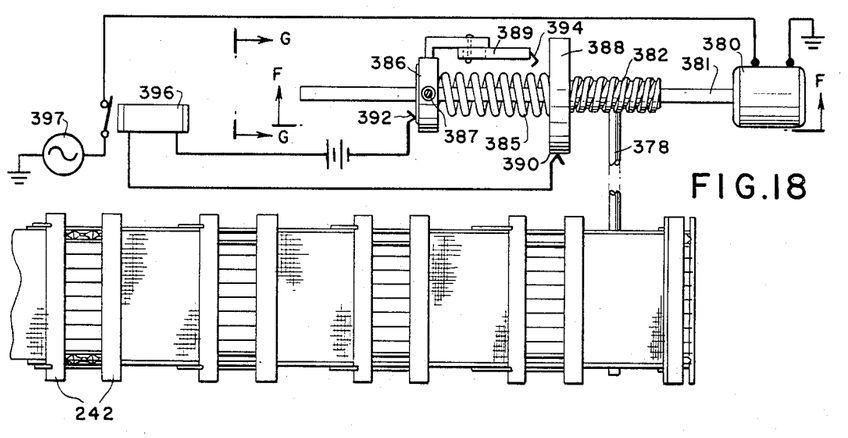
FIGURE 18 is a top view of a conveying and tensioning device.

A plurality of electronic components are held by hoppers 292 shown in FIGURES 15 through 17. In addition, these figures show a conveying means 300. FIGURE 15 shows the hoppers 292 supported by a horizontal bar 290. It should be noted that a top lead 257 of the electronic component 25 is bent towards the lead 258 so that it may enter a conical hole adjacent to the conical hole in which the lead 258 is inserted. Slots 293 are therefore provided to allow the top leads 257 to propagate along the hopper. In the case of transistors where three leads are involved, the side two leads may each be bent and propagated along each slot 293 provided by the hopper 292 and its support 290. The electronic components 25 are stored in their appropriate hoppers where they wait to be picked up, one by one, by the conveying means 300. The lower component is held by a latch means 298, which, in its normal position, is pushed by a lever pivoted around point 297, by spring 299 so that a tip of latch 298 extends under the lower opening of the hopper 292 and prevents the lower surface of the body of the electronic component 25 from advancing any further downwardly. Guide means 307 are provided for guiding the motion of a supporting angle 306. The angle 306 is actuated by a belt and pulley system 310 driven either by the operator or by electromechanical means (not shown). A lug 312, attached to the system 310 is used to limit the motion of the conveyors 300. FIGURE 15 shows the conveyor device 300 at its upper position. The upper portion of the angle 306 engages the upper portion of latches 298 to rotate it about pivots 297 to release one line of components from the hoppers 292 into the conveying means 300. While tip 298 is retracted, a tip 296 at the end of the upper portion of latch 298 is inserted inside hopper 292 through hole 294 to stop the components other than the lower line of components from advancing downwardly beyond hole 294. The released line of components drops into the conveying means 300, which then starts moving downwardly to insert leads 258 and the extension of bent leads 257 into the conical holes 246 of the dielectric mount 242. While the lower line of components is being lowered by the conveying means 300, the latches 298 rotate in a counterclockwise direction, as shown in FIGURE 17, to permit a new line of components to fall to the lowermost portion of the hoppers, and held there by the lower tip of latch 298. It should be noted that a group of components in the conveyor means 300 is prevented from falling by means of latches 302, while they are being lowered for assembly. The components are released from the latches 302 after they are crimped as hereinbefore described as the conveyor means 300 starts moving upwardly. The latch is slightly beveled at its lower tip to permit it to rotate out of the way of the component when the conveyor is raised as shown in FIGURE 17.

Figure 19:
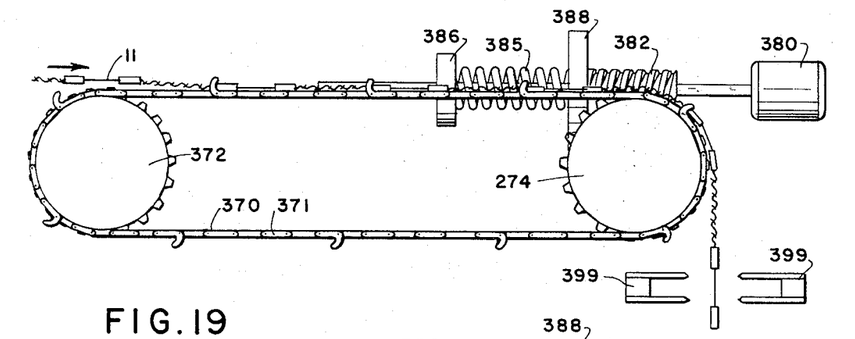
FIGURE 19 is a side view of the device shown in FIGURE 18.
Figures 20, 21:
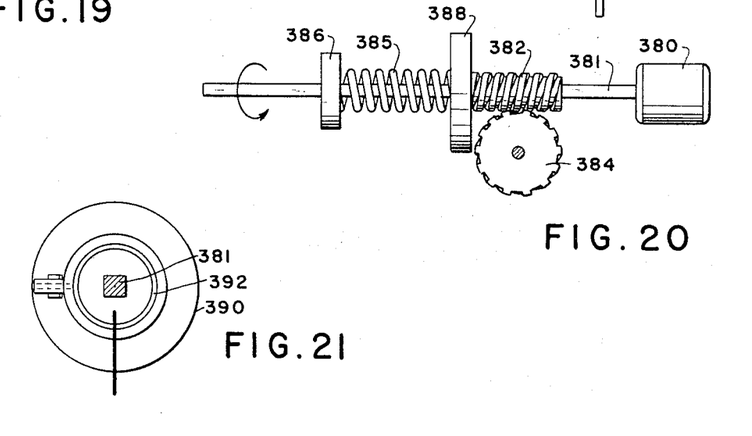
FIGURE 20 is a sectional view taken along line F—F of FIGURE 18.
FIGURE 21 is a sectional view taken along line G—G of FIGURE 18.

The woven networks, after assembly and crimping of the electronic components are pulled and carried away by a tensioning conveyor device 269 shown in FIGURES 18 through 21. FIGURE 19 shows a side view of a conveyor belt 370 comprising links 371 which are moved by means of a toothed wheel 274 and is carried on the other side by toothed wheel 372. Wheel 274 is rotated by shaft 378 which is axially connected to worm wheel 384. Worm wheel 384 is rotated by worm 382 which is driven by motor 380 through shaft 381. Shaft 381 is rectangular in shape outside the motor 380 so that worm 382 can rotate and also slide along shaft 381. Axially attached to worm 382 there is a wheel 388 which contains slip ring 390. Wheel 388 is pushed to the right, as viewed from FIGURE 20, by spring 385 which is supported on one side by an adjustable stop 386 and held in axial position on shaft 381 by means of a setting screw 387 to shaft 381. Assuming shaft 381 is rotated counter-clockwise, as is seen from the side of the motor looking towards the worm gear, a torque is applied on worm wheel 384, and a force corresponding to this torque is applied onto the worm by the worm wheel 384 so that spring 385 is compressed. Once this compression reaches a predetermined point which may be set by the setting of support 389, brush 394 touches slip ring 390 on wheel 388 and a circuit is closed through brush 392 wiping over slip ring 386, so that battery 395 supplies current to relay 396 and the power feeding motor 380 from power source 397 is disconnected. In this manner a constant tension is automatically provided to the weaved networks being processed. Referring to FIGURES 2 and 4, it should be noted that when the pair of cylinders 180 and 181 are rotated to release assembled woven material with the electronic components, slip ring 388 is retracted and relay 396 deactivated so that it closes the circuit for the motor 380 to be rotated and re-establish the predetermined tension. A process of cutting the electrical conductors extending between the mounts 242 of two successive woven networks is provided at the end of the tensioning device 369. During this process, cutting tools 399 are used to cut away the electrical conductors 11 at the end of each woven network.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. An electrical network comprising a first plurality of electrical conductors extending substantially parallel to each other, a first plurality of insulating means extending in the same direction as said first plurality of electrical conductors, a second plurality of electrical conductors extending substantially transverse to said first plurality of electrical conductors and interweaved with said first plurality of electrical conductors and with said first plurality of insulating means in a predetermined weaved pattern, a second plurality of insulating means extending in the same direction as said second plurality of electrical conductors interweaved with said first plurality of electrical conductors and with said first plurality of insulating means in a predetermined weaving pattern forming electrical connections between said first and said second plurality of electrical conductors at predetermined crossings.

2. An electronic harness comprising a first plurality of electrical conductors extending substantially parallel to each other, a first plurality of dielectric threads extending in the same direction as said first plurality of electrical conductors, a second plurality of electrical conductors extending substantially transverse to said first plurality of electrical conductors and said first plurality of dielectric threads and interweaved with predetermined conductors of said first plurality of electrical conductors and said first plurality of dielectric threads in such a pattern that both mechanical and electrical contacts results between predetermined second plurality of electrical conductors with predetermined first plurality electrical conductors, a second plurality of dielectric threads substantially parallel to said second plurality of electrical conductors, separating said first plurality of electrical conductors and interweaved with said first plurality of dielectric threads, whereby first plurality of dielectric threads with the second plurality of dielectric threads operate to insulate said first plurality of conductors from said second plurality of conductors at other predetermined crossings.

3. An electronic circuit comprising a plurality of electronic components each having conductive leads; and an electronic harness interconnectig said leads according to said circuit, said harness comprising a first plurality of electrical conductors extending substantially parallel to each other, a first plurality of dielectric threads extending in the same direction as said first plurality of electrical conductors, a second plurality of electrical conductors extending substantially transverse to said first plurality of electrical conductors and said first plurality of dielectric threads and interweaved with predetermined conductors of said first plurality of electrical conductors and said first plurality of dielectric threads in such a pattern that both mechanical and electrical contacts result between predetermined second plurality of electrical conductors with predetermined first plurality electrical conductors, a second plurality of dielectric threads substantially parallel to said second plurality of electrical conductors, separating said first plurality of electrical conductors and interweaved with said first plurality of dielectric thread, whereby said first plurality of dielectric threads and said second plurality of dielectric threads operate to insulate said first plurality of conductors from said second plurality of conductors at other predetermined crossings.

No references cited.

JOHN W. CALDWELL, *Primary Examiner.*

DONALD J. YUSKO, *Assistant Examiner.*